United States Patent [19]

Limmer et al.

[11] 4,149,062
[45] Apr. 10, 1979

[54] SCAVENGER HOOD FOR LASER

[75] Inventors: Ernst Limmer; Helmut Höfl, both of Freising, Fed. Rep. of Germany

[73] Assignee: Texas Instruments Deutschland GmbH, Freising, Fed. Rep. of Germany

[21] Appl. No.: 832,041

[22] Filed: Sep. 9, 1977

[30] Foreign Application Priority Data

Sep. 29, 1976 [DE] Fed. Rep. of Germany ....... 2643981

[51] Int. Cl.² .............................................. B23K 9/00
[52] U.S. Cl. .................................................. 219/121 L
[58] Field of Search .................... 219/121 L, 121 LM; 15/339

[56] References Cited
U.S. PATENT DOCUMENTS

| 3,626,141 | 12/1971 | Daly | 219/121 L |
| 3,866,398 | 2/1975 | Vernon et al. | 219/121 L X |

Primary Examiner—J. V. Truhe
Assistant Examiner—Fred E. Bell
Attorney, Agent, or Firm—James T. Comfort; Rene E. Grossman; N. Rhys Merrett

[57] ABSTRACT

Laser beam scribing apparatus having a nozzle assembly in which a partition defines a travel path for the laser beam and separates the travel path from a surrounding suction chamber. The suction chamber terminates in a suction aperture coplanar with and surrounding the laser beam exit aperture. In operation, application of a vacuum source to the suction chamber causes foreign particles to enter solely into the suction chamber thereby preventing such particles interfering with the focus or intensity of the laser beam.

6 Claims, 3 Drawing Figures

SCAVENGER HOOD FOR LASER

The invention relates to an apparatus for suctioning off dust created when when semiconductor slices or discs are scored or scribed, by means of laser beams, including a suction chamber connected to a vacuum source, which chamber is arranged around the path of the laser beam. The laser beam passes through the chamber and emerges through a suction aperture concentrically surrounding said path.

In the production of semiconductor components, e.g., diodes, it is customary first to form a large number of identical components on a thin semiconductor slice or disc, which is then partially scored, for example, by a laser beam, so that it can be broken to separate the individual components. As the laser beam impinges on the surface of the semiconductor disc, the semiconductor material is burned. In order that the dust forming during combustion will not adhere on the semiconductor surface, making the semiconductor components to be produced unusable, it is suctioned off by means of a suction chamber concentrically surrounding the laser beam and through which the beam passes. The suction aperture of the suction chamber, from which the laser beam emerges and impinges on the surface of the semiconductor disc, is arranged in the immediate vicinity of the surface to be scored.

A conventional suction chamber is closed off at its top by a glass plate, through which the laser beam enters the chamber. The laser beam then traverses the chamber and leaves it through the suction aperture. The combustion products which during the suction process whirl around in the suction chamber in the form of dust particles may set on the entrance surface formed by a glass plate, through which the laser beam enters the chamber. As a result, the laser beam can be uncontrollably deflected as it enters the suction chamber, so that the precision of the scoring is greatly impaired. Also the dust swirling around in the suction chamber, which the laser beam must penetrate before it reaches the surface of the semiconductor disc, impairs the scoring operation.

It has proved in practice to be necessary completely to clean the region through which the laser beam enters the suction chamber, and the suction chamber itself, after each scoring of a semiconductor disc. This cleaning operation takes a considerable portion of the time assigned for the scoring of a disc, which is reflected in the total manufacturing costs of the semiconductor components.

It is an object underlying the invention to design an apparatus of the kind described so that a major reduction of the maintenance time is obtained without impairment of the precision of the scoring operation.

According to the invention, this problem is solved by providing in the suction chamber a partition which concentrically surrounds the path of the laser beam to within the immediate vicinity of the suction aperture.

In the suction apparatus according to the invention, the laser beam is practically completely separated from that part of the suction chamber into which the dust penetrates. The beam, therefore, is in no way disturbed by the dust swirling around in the suction chamber on its way to the suction aperture. In particular, there can be no fouling of the area through which the laser beam enters the zone of the suction chamber surrounded by the partition. A dispersion and weakening of the laser beam by the dust particles depositing on the entrance surface therefore no longer occurs. This surface now needs to be cleaned only at very long intervals of time.

Advantageously, in a preferred embodiment of the invention, the external side of the partition is the surface of a cone tapering toward the suction aperture. Due to this design of the suction apparatus, especially favorable flow conditions are obtained at the suction aperture, which permit extremely effective removal by suction of the dust created during and by the scoring operation. This improvement leads to a much cleaner surface of the semiconductor disc, which manifests itself in a clearly perceptible reduction of the proportion of ususable components.

To facilitate access to the suction chamber for purposes of cleaning, it may advantageously be provided that the suction chamber is fastened by means of a bayonet lock on the front of a laser beam generator at which the laser beam emerges.

By way of example, an embodiment of the invention will now be explained in greater detail, with reference to the drawings in which.

Figure 1:
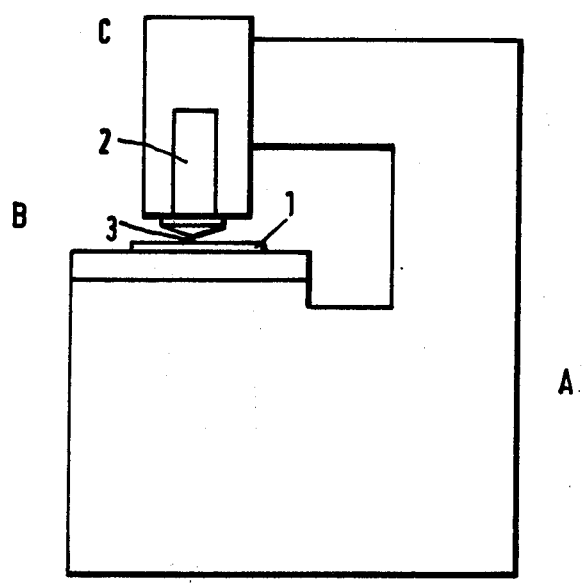
FIG. 1 is a greatly simplified view of a laser beam scribing machine for semiconductor or discs using a suction nozzle embodying the invention.

The machine illustrated in FIG. 1 serves to score (scribe) semiconductor discs by means of a laser beam, so that electronic components formed in the semiconductor disc can subsequently be separated from one another by breaking the disc. In the greatly simplified illustration of FIG. 1, this machine comprises a pedestal A, which carries on an X-Y table B, a semiconductor disc 1 to be scored. On a cantilevered arm of pedestal A, over the X-Y table B, a laser head C is secured, which contains a laser beam generator 2. This laser beam generator 2 generates a laser beam 3, which exits through a nozzle assembly D and scores the semiconductor disc 1 lying on the X-Y table B.

Figure 2:
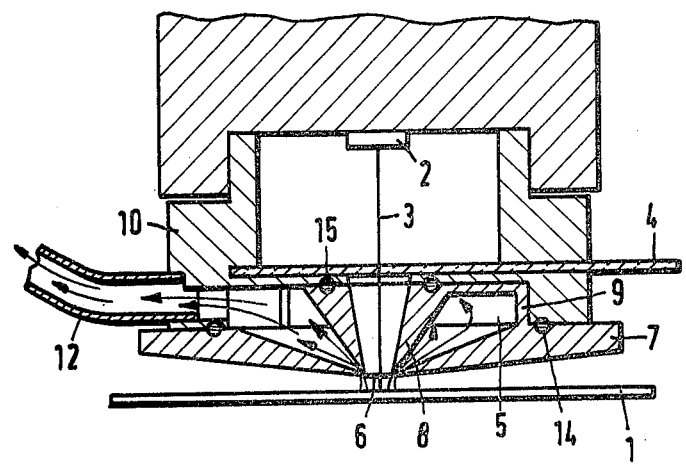
FIG. 2 is a schematic sectional view of the suction nozzle connected to the machine of FIG. 1.

FIG. 2 shows the nozzle assembly D in more detail. The laser beam generated by generator 2 first passes through a glass plate 4 before traversing a suction chamber 5 and emerging through an aperture 6, which is provided in a wall 7 closing the suction chamber at the front (lower side), and impinging on the surface of the semiconductor disc 1.

In the suction chamber 5 the laser beam 3 is surrounded by a partition 8, which concentrically surrounds it to within the immediate vicinity of the aperture 6. The external side of partition 8 is the surface of a cone tapering toward the aperture 6. Also the internal side of wall 7 of the suction chamber is conical, so that there is formed in the region of the aperture 6 a suction opening (6A) concentrically surrounding the laser beam 3 and the aperture 6. Preferably the aperture 6 and the opening 6A are coplanar. The opening 6A defines an inlet which widens toward the interior of the suction chamber 5 so that the cross-section of the suction chamber progessively increases towards the interior thereof.

Figure 3:
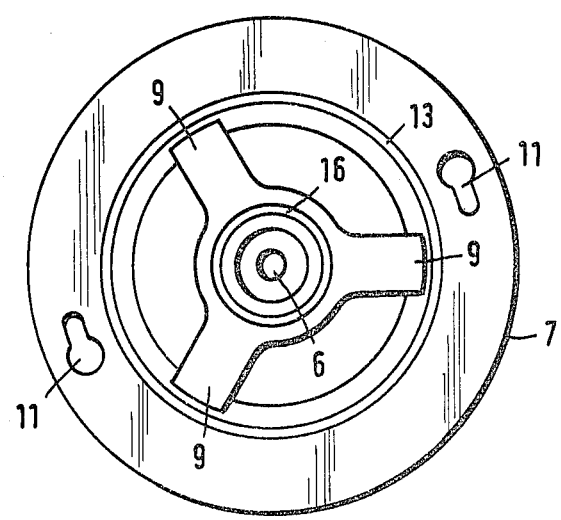
FIG. 3 is a top view onto the suction apparatus of FIG. 2, removed from the scribing machine.

As shown by FIG. 3 in particular, the partition 8 is connected with the wall 7, delimiting the suction chamber 5 at the bottom, by means of three webs or arms 9 extending at an angle of 120° to each other.

The wall 7 with the arms 9 formed thereon and with the partition 8 supported by said arms is secured by means of a bayonet lock to a retaining member 10 concentrically surrounding the laser beam 3. The openings 11 belonging to this bayonet lock are shown in FIG. 3. A tube 12 also is connected to the retaining member 10 so that communication can be established between the suction chamber 5 and a vacuum source V.

To obtain a good seal between the suction chamber and the retaining member 10, an o-ring 14 lying in a groove 13 is provided between the top side of wall 7 and the corresponding counterface on the retaining member 10. Another such o-ring 15 is provided between the upper front face of partition 8 and the corresponding counterface on the retaining member 10 in a groove 16 of the partition.

During operation of the described suction apparatus, the laser beam 3 scores the surface of the semiconductor disc 1 by burning the semiconductor material at the point of impingement. The combustion products are sucked in the form of dust through the opening 6A between partition 8 and wall 7 into the suction chamber 5, whence they are then removed by suction through tube 12. The particular design of partition 8 and wall 7 of the suction chamber illustrated in FIG. 1 results at the semiconductor surface in a powerful nonturbulent flow, which provides for a very good cleaning of the surface. The elongated passage 8A defined by partition 8, through which the laser beam travels to the surface of the semiconductor disc 1, remains practically dust-free, as there is no suction prevailing in it. As a result, the glass plate 4 is not fouled by the dust created by the combustion, so that neither the focusing nor the intensity of the laser beam is impaired.

If after a prolonged period of use it should nevertheless prove necessary to clean the suction chamber, the suction chamber can readily be removed by releasing the bayonet lock. The gaps between the arms 9 permit simple blowing out of the suction chamber by means of compressed air, which takes little time. When using the described suction apparatus, cleaning operations are seldom necessary; besides, they can be carried out so quickly that compared with the time required for the scoring of the semiconductor discs their duration is practically negligible.

As can be seen from FIG. 2, the lower front face of wall 7 is so designed that it extends obliquely upward from the suction aperture 6. This conical design of the front face of wall 7 is to prevent the semiconductor disc 1, which is normally retained on a table by means of a suction directed against its underside from being lifted off this table and sucked against the suction opening 6A.

What is claimed is:

1. Laser beam scribing apparatus having a nozzle assembly comprising a first member defining an elongated passage terminating at one end in an outlet aperture and providing a laser beam travel path; transparent means closing the opposite end of said passage; said first member including spaced apart web members connecting said first member to a second member surrounding said first member, said second member defining a suction chamber surrounding said elongated passage; and means for connecting said suction chamber with vacuum source means; said suction chamber terminating in a suction aperture and having a progressively increasing cross-sectional area in a direction from said suction aperture into the interior of said suction chamber, said suction aperture concentrically surrounding and substantially coplanar with said outlet aperture such that said elongated passage is effectively isolated from said suction chamber and external foreign particles in the region of said apertures pass, on application of said vacuum source, substantially solely through said suction aperture into said suction chamber and not into said elongated passage.

2. Apparatus according to claim 1, wherein said first member and said second member have external and internal walls respectively which conically taper toward said suction aperture at different angles with respect to said laser beam travel path.

3. Apparatus according to claim 1, wherein said nozzle assembly includes means for releasably securing said nozzle assembly to said scribing apparatus.

4. Laser beam scribing apparatus having a nozzle assembly comprising a first member defining a passage terminating in an outlet aperture and providing a laser beam travel path; means including spaced web members connecting said first member to a second member surrounding said first member; said first member having an external wall and said second member having an internal wall that together define a suction chamber terminating in a suction aperture located closely adjacent to and concentrically surrounding said outlet aperture, at least the internal wall of said second member tapering toward said outlet aperture such that said suction chamber has an increasing cross-sectional width and flares in a direction extending from the outlet aperture into the interior of the suction chamber semiconductor and means for connecting said suction chamber to vacuum source means.

5. Apparatus according to claim 4, wherein said first member is a partition member located within said second member, said partition member having an external surface conically tapering toward sad suction aperture less steeply than the tapered external surface of said second member.

6. Apparatus according to claim 4, wherein said nozzle assembly includes means for releasably securing said nozzle assembly to said scribing apparatus.

* * * * *